Figure 1:
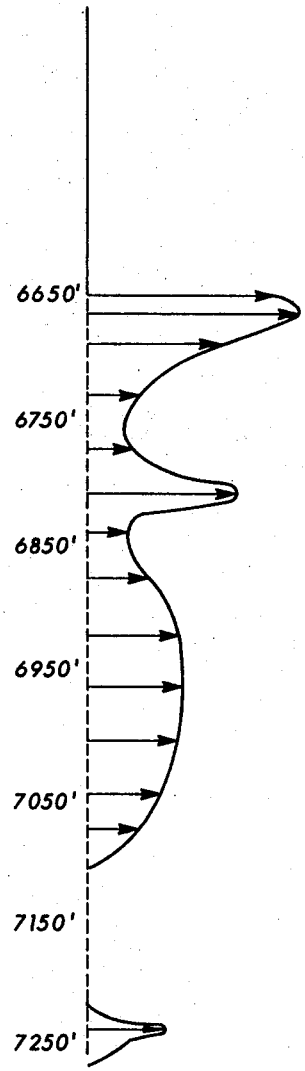

United States Patent
Showalter

[15] 3,677,343
[45] July 18, 1972

[54] METHOD FOR IMPROVING THE INJECTION PROFILE OF A WATER INJECTION WELL

[72] Inventor: William E. Showalter, Seal Beach, Calif.
[73] Assignee: Union Oil Company of California, Los Angeles, Calif.
[22] Filed: July 16, 1970
[21] Appl. No.: 55,339

[52] U.S. Cl. ..........................166/252, 166/274, 166/294
[51] Int. Cl. ..........................E21b 43/22
[58] Field of Search ..........................166/252, 268, 273–275, 166/280, 294, 305

[56] References Cited

UNITED STATES PATENTS

| | | | |
|---|---|---|---|
| 3,316,965 | 5/1967 | Watanabe | 166/280 |
| 2,604,947 | 7/1952 | Martin | 166/273 |
| 3,193,007 | 7/1965 | Kiel et al. | 166/273 |
| 3,302,719 | 2/1967 | Fischer | 166/280 |
| 3,323,589 | 6/1967 | Harvey | 166/274 |
| 3,336,977 | 8/1967 | Amott | 166/274 |
| 3,342,263 | 9/1967 | Fischer | 166/280 |
| 3,368,620 | 2/1968 | Harvey | 166/274 |
| 3,370,650 | 2/1968 | Watanabe | 166/280 |
| 3,480,084 | 11/1969 | Eilers | 166/294 X |

OTHER PUBLICATIONS

Garland, " Selective Plugging of Water Injection Wells," Journal of Petroleum Technology, Dec. 1966, pp. 1550–1560.

*Primary Examiner*—Stephen J. Novosad
*Attorney*—Milton W. Lee, Richard C. Hartman, Lassas S. Henderson, Dean Sandford and Robert E. Strauss

[57] ABSTRACT

A method for improving the injection profile of flood water into a heterogeneous subterranean formation penetrated by a water injection well which comprises first establishing a flow of flood water into the formation through the injection well such that the velocity of the water in the well is sufficient to transport subsequently injected solid diverting agent particles down the well and, while maintaining a substantially constant flow of flood water into the well, dispersing in the flood water particles of a solid water-insoluble diverting agent.

5 Claims, 2 Drawing Figures

Patented July 18, 1972  3,677,343

INVENTOR.
WILLIAM E. SHOWALTER
BY
Dean Sandford
ATTORNEY

METHOD FOR IMPROVING THE INJECTION PROFILE OF A WATER INJECTION WELL

This invention relates to the recovery of oil from a permeable subterranean formation by waterflooding, and more particularly to a method for improving the injection profile of flood water injected into a heterogeneous permeable subterranean formation surrounding a water injection well.

It has long been recognized that substantial amounts of oil remain unrecovered at the completion of normal primary recovery operations. Hence, various secondary method of recovering additional quantities of oil have been proposed, such as the well-known technique of waterflooding in which water is injected into the reservoir through one or more injection wells to drive additional oil toward one or more spaced production wells. Often, the injection and production wells are arranged in patterns designed to achieve maximum contact of the oil-bearing zones by the advancing flood front, such as the conventional "five-spot" pattern wherein a central producing well is surrounded by four somewhat symmetrically located injection wells. Another of the conventional flooding patterns sometimes employed in waterflooding is the "line drive" pattern in which injection wells are arranged in a line so that the injected flooding medium advances through the formation to displace oil toward one or more spaced production wells that can also be arranged in a line substantially parallel to the line of injection wells. Also, water is sometimes injected into a reservoir through patterned injection wells early in the productive life of the reservoir to maintain the reservoir pressure elevated, thereby increasing the amount of oil recovered from the reservoir.

Typically, permeabilities and porosities through an oil-bearing reservoir vary greatly with depth. A ten-fold or even a hundred-fold variation in permeability is common. When flood water or other displacing medium is injected into such a reservoir through an injection well, the highly permeable zones or streaks have a natural tendency to accept substantially the entire volume of the injected flood water, to the substantial exclusion of the less permeable zones. This uneven flow pattern, if uncorrected, is a great detriment to a waterflooding operation and can lead to its complete failure.

The problem of uneven flow is also a problem in a pattern waterflood where the reservoir is composed of a plurality of non-communicating layers. The flood water preferentially fingers through the more permeable layers, causing a premature breakthrough of water at the producing wells.

In the past, fluid loss to thick zones have been corrected by isolating the thief zone with packers, or a packer and a sand plug, or by cementing the high permeability strata. These techniques were often only partially successful and required special, costly procedures.

Various selective plugging techniques for improving the injection profile of flood water into a heterogeneous subterranean formation surrounding a water injection well have been proposed. For example, it has been proposed that the injection of flood water be interrupted and a bulk quantity of dry solid plugging or diverting agent particles introduced directly into the well. Alternatively, the solid diverting agent particles can be slurried in a suitable liquid contained in a separate tank, such as a separate portable field tank or tank truck, and the slurry pumped directly into the well. In either case, flood water injection is resumed to displace the diverting agent particles downwardly through the well and into contact with the well wall adjacent to the permeable strata. While it is desired that the subsequently injected flood water carry the diverting agent particles to the more permeable strata so as to preferentially plug these strata, in practice it is found that the solid diverting agent particles are often not distributed in accordance with the permeability of the strata so that the desired uniform injection profile is not obtained. Also, slug treatment can cause plugging of the well, particularly where the diverting agent is introduced through a tubing string. Thus, need exists for a method of improving the injection profile of a water injection well which may be simply and inexpensively practiced under field conditions.

Accordingly, it is a principal object of the present invention to provide a method for improving the injection profile of a water injection well. Another object of the invention is to provide a method for selectively reducing the permeability of the more permeable strata of a heterogeneous formation penetrated by a water injection well whereby the water injectivity of the formation is rendered more uniform. Still another object of the invention is to provide an improved method of waterflooding heterogeneous subterranean formations having strata of varying permeabilities penetrated by a water injection well in which the injection profile of flood water injected through the injection well is rendered more uniform. A further object of the invention is to provide a relatively simple, inexpensive method of improving the water injection profile of a water injection well. A still further object of the invention is to provide a method for improving the injection profile of a water injection well that does not require expensive preparation of the well. A still further object of the invention is to provide a method for improving the injection profile of a water injection well that does not require expensive preparation of the well.

Figure 2:
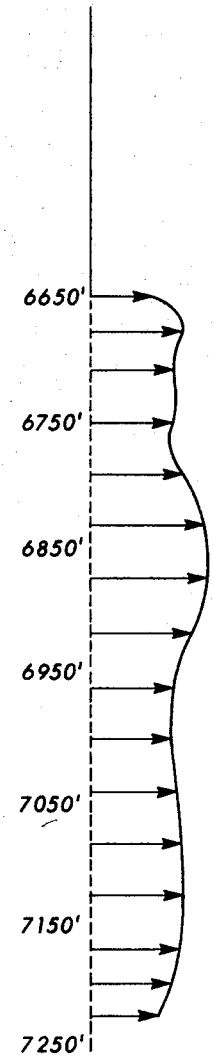

The manner of accomplishing the foregoing objects as well as other objects and advantages of the invention will be apparent from the following description together with the accompanying drawings, in which:

FIG. 1 illustrates the relative flow rate of flood water into various strata of a heterogeneous formation penetrated by a water injection well prior to treatment by the method described in Example 1; and FIG. 2 illustrates the relative flow rate of flood water into the various strata of the same formation after treatment by the method described in Example 1.

Briefly, this invention contemplates improving the injection profile of flood water into a heterogeneous subterranean formation penetrated by a water injection well which comprises first establishing a flow of flood water into the formation through the injection well such that the velocity of the water in the well is sufficient to transport subsequently injected solid diverting agent particles down the well and, while maintaining a substantially constant flow of flood water into the well, dispersing in the flood water particles of a solid water-insoluble diverting agent to provide a dilute dispersion of the diverting agent particles in the flood water.

Wells fitted for water injection are conventionally cased through the injection zones and perforated, or the well can be cased to a point above the injection zones and perforated liner installed through these zones. The flood water can be injected through the casing or through a tubing string installed within the casing. In certain cases where multiple zones are to be simultaneously flooded, flood water will be injected through both the casing and one or more tubing strings. In any event, the water passes downwardly through the well and into contact with the exposed face of the formation, whereupon it enters into the permeable strata of the formation.

The amount of flood water entering into the formation at any particular point along the exposed face is dependent upon the water permeability of the formation. Thus, where the formation is of substantially uniform permeability throughout its vertical extent in communication with the injection well, the flow of flood water into the formation is substantially uniform along the entire exposed formation face. Accordingly, the rate of flow of flood water into the formation is substantially equal at all points of the exposed face and the formation exhibits a substantially uniform water injection profile. In contrast, where the formation is of non-uniform water permeability, i.e., where it is composed of strata of substantially different water permeabilities, the flow of flood water into the formation along the exposed formation is not uniform. Under these conditions the rate of flow of flood water into the formation is different at various points of the exposed face and the formation exhibits a substantially nonuniform water injection profile. The term "water injection profile" as used herein means the relative flow rates of water into the exposed formation face. For example, where the formation has a uniform water injection profile, flood water is entering the formation at substantially equal flow rates at all points along the exposed formation face and where the formation has a nonuniform or poor water injection profile, flood water is entering the formation at substantially different flow rates at various points along the exposed formation face. For purposes of this invention, a nonuniform injection profile may be considered one in which substantial portions of the exposed formation is taking little or no water, or where the flow of water into any particular strata in terms of barrels of water per foot of formation is more than twice the average flow rate into the entire exposed formation face.

The method of this invention has particular application in treating a heterogeneous subterranean formation comprised of a plurality of alternated high and low permeability strata in which there is little or no communication between the various strata, i.e., there is little or no vertical permeability between the alternated layers of high and low horizontal permeability.

The term "flood water" as used herein is meant to include any aqueous liquid injected into a permeable subterranean formation for the purpose of displacing oil towards a production well spaced apart in the formation from the injection well or for maintaining the pressure in an oil-bearing reservoir elevated, inclusive of which are water; brines such as oil field and synthetic brines; and viscous water thickened by the addition of a viscosity increasing agent to reduce the mobility of the medium in the porous formation. In one embodiment of the flooding process the thickening agent is added to only an initial portion of the floodwater.

The various known viscosity increasing additives which can be employed to thicken the flood water include fatty acid soaps, alginates, sucrose, dextran, amines, glycerine, finely divided clays such as montmorillonite, and a number of water-soluble polymers. Of these, the water-soluble polymers are generally preferred. Water soluble polymers useful in the practice of this invention include guar gum, modified starches, Xanthum gum prepared by the fermentation of starch derived sugar, alkyl and hydroalkyl cellulose derivatives, carboxymethyl cellulose, polyvinyl alcohol, polyvinyl pyrrolidone, polyacrylic acid, polyacrylamide, polystyrene sulfonate, ethylene oxide polymers, acrylic acid-acrylamide copolymers and acrylic acid-acrylamide-diacetone acrylamide terpolymers. The amount of thickening agent incorporated into the flood water to achieve any specific viscosity increase depends upon the characteristics of the flood water and its temperature, and the particular thickening agent employed.

The diverting agents employed in the practice of this invention are particles of a water-insoluble solid material which can vary widely in size and shape. Typically, these particles can be speroids, cubes, granules, buttons, flat disks, or mixtures thereof, having mean diameters between about 1 micron, or less, to about one-half inch. More particularly, the particles can be cubes, buttons, or disks having mean diameters between about one-eighth inch to one-half inch, speroids or granules in the size range of from about 4 to 200 mesh U.S. Standard screen, or particles having mean diameters between about 1 to 50 microns.

While substantially any relatively finely divided, water-insoluble solid plugging material can be employed in the practice of this invention, it is preferred that the plugging agent comprise finely divided particles of an oil-soluble, water-insoluble solid material. Particularly, preferred plugging agents are finely divided particles comprised of a homogeneous mixture of polymer, wax and resin components disclosed in U.S. Pat. No. 3,302,719; solid particles comprised of a homogeneous mixture of polymer and non-gaseous hydrocarbon disclosed in U.S. Pat. No. 3,316,965; solid particles comprised of a homogeneous mixture of polymer and halogenated aromatic hydrocarbon disclosed in U.S. Pat. No. 3,342,263; and solid particles comprised of a homogeneous mixture of a polymer component and a solid alcohol disclosed in U.S. Pat. No. 3,363,690.

An especially preferred diverting agent for use in the practice of this invention are solid particles comprised of petroleum wax or homogeneous mixtures of polymer and wax having the above disclosed shapes and particle diameters. A particularly preferred diverting agent is comprised of finely divided particles of a solid petroleum wax or homogeneous mixture of wax and polymer having diameters within the range of about 1 to 50 microns disclosed in U.S. Pat. No. 3,455,390.

Most of the preferred diverting agent particles have specific gravities below about 0.95 and, hence, are buoyant in the flood water. It is important that the diverting agent particles dispersed in the flood water be transported down the well in the injected flood water and into contact with the exposed formation face. Thus, where the diverting agent particles are buoyant in the flood water, the flood water must be injected into the well at a rate such that the velocity of the flood water in the well exceeds the rate of rise of the diverting agent particles in the flood water under quiescent conditions. The buoyant particles will be transported down the well so long as velocity of the flood water downwardly in the well exceeds the rate of rise of the particles in the flood water.

The rate of rise of the buoyant diverting agent particles in the flood water is dependent upon the mass, size, shape and density of the particles, and the viscosity and density of the flood water. The preferred diverting agents are generally comprised of particles of different sizes within a specified size range. Because of the differences in the mass and size of the individual diverting agent particles, they rise through the flood water at different rates, the larger diameter particles rising more rapidly than the smaller diameter particles of the same material. Since the velocity of the flood water in the well must be sufficiently high to transport substantially all of the diverting agent particles down the well, the rate of rise of the more rapidly rising particles are of primary concern. In other words, the flood water velocity in the well must be sufficiently high to transport the most buoyant, i.e., the particles having the highest rate of rise in the flood water, and the more slowly rising particles will be readily transported down the well. In calculating the velocity of flood water in the well, the limiting velocity, i.e., the lowest flood water velocity will be encountered in the largest diameter section of the well. It is important the the minimum velocity be employed in selecting the proper size diverting agent particles.

The rate of rise of the diverting agent particles in a particular flood water can be determined by a simple test employing a glass or transparent plastic tubular flotation cell having a diameter of about 2 inches and a length of approximately 4 feet. A pair of spaced reference marks are inscribed a known, fixed distance apart on the tube. Approximately 2 grams of the particulate diverting agent is placed in the flotation cell and the cell completely filled with the flood water so that no air is present in the cell. If desired, the flood water in the cell can be heated to a temperature corresponding to the temperature of the injection well by placing the cell in a temperature controlled bath, allowance being made for thermal expansion of the flood water during heating. When the diverting agent particles have accumulated at the top of the flotation cell and the flood water in the cell is at the desired temperature, the cell is inverted and the time required for the more rapidly rising particles to pass between the reference marks is measured. The rate of rise in feet per minute is then calculated from the time required for the particles to travel the known distance between the reference marks.

The rate of rise of various size particles of a homogeneous solid solution of paraffin wax and polymer have been experimentally determined and are reported in Table 1.

TABLE 1

RATE OF RISE OF SOLID PARAFFIN WAX-POLYMER PARTICLES IN WATER AT 75°F.

| Particle Diameter, | Rate of Rise, feet per minute |
| --- | --- |

| | |
|---|---|
| 0.01 | 1.2 |
| 0.02 | 2.3 |
| 0.03 | 3.4 |
| 0.04 | 4.5 |
| 0.05 | 5.5 |
| 0.06 | 6.5 |
| 0.07 | 7.5 |
| 0.08 | 8.3 |
| 0.09 | 9.2 |
| 0.10 | 10.0 |
| 0.12 | 11.4 |
| 0.14 | 12.5 |
| 0.16 | 13.5 |

These data represent typical values for a particular diverting agent in water. It is preferred that data be obtained for the particular diverting agent and flood water to be employed.

For any particular flood water and any particular diverting agent composition, both the flood water velocity and the diverting agent particle size can be controlled to assure that the diverting agent particles are transported down the well by the flood water. As can be seen from Table 1, the particle size greatly effects the rate of rise of the particles in the flood water, and therefore, within the limitations of particle sizes that will pass through the perforations or slots in the well casing and the particle size required for efficient plugging of the more permeable strata of the formation, the size of the diverting agent particles employed can be selected to assure their transport down the well by the flood water.

In the practice of the invention, a flow of flood water into the formation through the injection well is established such that the velocity of the water in the well is sufficient to transport the subsequently injected solid diverting agent particles down the well. The particulate diverting agent is dispersed in the flood water to provide a dilute dispersion of the diverting agent particles in the flood water. The diverting agent particles are transported down the well and are deposited on the exposed formation face and in fractures, vugs and fissures in the formation in an amount proportional to the flow of flood water into the formation. Hence, those strata taking the largest proportion of the injected flood water will receive a similar proportion of the diverting agent and those strata of the reservoir taking smaller proportions of flood water will receive a similar smaller proportion of the diverting agent. For example, if 90 percent of the flood water is entering one strata of the formation, approximately 90 percent of the diverting agent will be deposited in this strata. As the injection of the dispersion is continued, the permeability of the more permeable strata is preferentially decreased and the relative flow of flood water into these strata is reduced and redistributed to other strata of the formation. This selective plugging and redistribution is continued until the water injection profile is improved, i.e., until the water injection profile is rendered more uniform.

It is important that the particulate diverting agent be dispersed in the flood water in an amount that will provide a dilute dispersion of diverting agent in the flood water. Suitable dispersions are prepared by dispersing the diverting agent in the flood water in an amount equivalent to not more than about 3 pounds of diverting agent per barrel of flood water, and preferably in an amount equivalent to 0.3 to 3 pounds of diverting agent per barrel of flood water. At dispersion rates of less than about 0.3 pounds per barrel, the treatment is unnecessarily lengthy; and plugging and improper distribution of the diverting agent can occur at dispersions rates in excess of about 3 pounds per barrel.

In cases of wells having a vacuum surface pressure, the well can be opened and the dry diverting agent particles or a concentrated aqueous dispersion of particles slowly introduced into the well to form therein the dilute dispersion of the proper particle concentration. Alternatively, and in wells having an elevated surface pressure, a concentrated slurry of the particulate diverting agent in water can be prepared in a separate field tank or tank truck and pumped under pressure into the well. A preferred technique for dispersing the particulate diverting agent in flood water is disclosed in my copending U.S. Patent application entitled "Method and Apparatus for Dispersing a Solid Material in a Liquid".

An indication of the effectiveness of the diverting operation can be obtained by monitoring the surface injection pressure during the plugging process. In the case of vacuum wells, if the diverting operation is successful the well will fill with liquid and the injection of diverting agent must be discontinued or switched to pressure injection. With wells having positive surface pressures, the increase in surface injection pressure obtained is an indication of the effectiveness of the diverting operation. However, in either case, injection profiles are best determined by spinner surveys, or by static temperature surveys from which the injection profile can be estimated.

The invention is further described by the following examples which are illustrative of specific modes of practicing the invention as defined by the appended claims.

EXAMPLE 1

This example illustrates the improvement in the flood water injection profile that is obtainable in a heterogeneous permeable formation penetrated by a water injection well by treatment in accordance with the method of this invention. The injection well is completed with about 600 feet of slotted liner between the depths of 6,650 and 7,250 feet.

Flood water is injected into the well at a rate of about 1,800 barrels per day with a vacuum surface pressure. Flood water injection is discontinued and a static well temperature survey conducted to determine the temperature at various depths. Also, the velocity of the flood water in the well is calculated to ascertain that it exceeds the maximum rate of rise of the particles of diverting agent in the flood water.

Next, flood water injection is resumed at a rate of about 1,800 barrels per day and the well treated by the addition of 600 pounds of finely divided diverting agent added to the injected flood water at the rate of about 1.3 pounds per barrel of flood water. The diverting agent is a particulate homogeneous solid solution of paraffin wax and polymer having a particle size such that at least 50 percent of the particles are smaller than 40 micron and 98 percent of the particles pass a 100 mesh U.S. Standard screen marketed by the Union Oil Company of California under the trademark Unibeads.

At the conclusion of the treating operation the surface pressure increased to about 400 psig. Flood water injection is discontinued and a second static temperature survey conducted. The water injection profiles both before and after treatment are estimated from the static temperature surveys and graphically illustrated in FIGS. 1 and 2, respectively. In FIGS. 1 and 2, the relative lengths of the horizontal lines are indicative of the relative amount of flood water entering the strata at the indicated depth. It is apparent that, prior to treatment, the bulk of the flood water is entering strata at about 6,650 feet, 6,800 feet, and between 6,875 and 7,050 feet. Little water is entering the strata at 6,750 feet, 6,850 feet and between 7,000 and 7,200 feet. After treatment, the flood water is entering all strata at a substantially uniform flow rate.

EXAMPLE 2

The rate of rise of a sample of a particulate diverting agent is determined by the following technique. The flotation cell is a 4 foot length of 30 millimeter glass tubing sealed at either end with a rubber stopper. A pair of reference marks are inscribed on the tubing at a spacing of 36 inches. A hyperdermic syringe is inserted into the cell through one of the stoppers to provide a variable volume liquid reservoir in communication with the cell.

A 2 gram sample of a solid, particulate, water-insoluble diverting agent that is buoyant in the flood water is slurried with a small volume of water containing a surfactant. The diverting agent particles have sizes in the range of 6 to 100 mesh U.S. Standard screen. The slurry is placed in the flotation cell and the cell completely filled with deaerated flood water. The stopper containing the hyperdermic syringe is inserted into the tubing so that excess liquid in the cell is forced through the needle and into the syringe. In this manner, air is substantially completely excluded from the cell.

The cell is then inverted and the time required for the fastest and slowest rising particles to pass between the inscribed marks noted. It is found that the fastest rising particles require 10 seconds to pass between the marks and the slowest rising particles require 8 minutes and 3 seconds. These times correspond to rates of rise of 18 and 0.6 feet per minute, respectively.

While particular embodiments of the invention have been described, it will be understood, of course, that the invention is not limited thereto since many modifications can be made and it is intended to include within the invention such modifications as are within the scope of the claims.

The invention having thus been described, I claim:

1. A method for improving the injection profile of flood water injected into a heterogeneous subterranean formation having strata of varying permeabilities penetrated by an injection well wherein the flood water injected through the injection well preferentially enters the more permeable of said strata, which comprises:
   determining the rate of rise of particles of a water-insoluble solid diverting agent in said flood water under quiescent conditions;
   injecting said flood water into said injection well at a flow rate such that the downward velocity of said flood water in said well exceeds the rate of rise of said diverting agent particles in the flood water under quiescent conditions; and
   while maintaining a substantially constant flow of flood water into said well dispersing in said flood water particles of said particulate solid water-insoluble diverting agent.

2. The method defined in claim 1 wherein said solid diverting agent is dispersed in said flood water in an amount equivalent to about 0.3 to 3 pounds of said solid diverting agent particles per barrel of flood water.

3. The method defined in claim 1 wherein said solid diverting agent comprises particles of a homogeneous solid solution of paraffin wax and polymer having sizes within the range of about 1 micron to about one-half inch.

4. The method defined in claim 3 wherein said flood water is water, brine, or a viscous aqueous solution thickened by the addition of a viscosity increasing agent.

5. A method for improving the injection profile of water, brine, or viscous aqueous flooding medium into a heterogeneous subterranean formation having strata of varying permeabilities penetrated by an injection well within the flooding medium injected through the injection well preferentially enters the more permeable of said strata, which comprises:
   determining the rate of rise in said flooding medium under quiescent conditions of particles of a water-insoluble, solid diverting agent comprised of a homogeneous solid solution of paraffin wax and polymer and having sizes within the range of about 1 micron to about one-half inch;
   injecting said flooding medium into said injection well at a flow rate such that the downward velocity of said flooding medium in said well exceeds the rate of rise of said diverting agent particles in the flooding medium under quiescent conditions; and
   while maintaining a substantially constant flow of flooding medium into said well dispersing in said flooding medium about 0.3 to 3 pounds of said particulate solid water-insoluble diverting agent per barrel of flooding medium.

* * * * *